US012271127B2

(12) United States Patent
Kawasaki et al.

(10) Patent No.: US 12,271,127 B2
(45) Date of Patent: Apr. 8, 2025

(54) PRESSING DEVICE AND IMAGE FORMING APPARATUS

(71) Applicants: Ryohsuke Kawasaki, Tokyo (JP); Takahiro Konishi, Tokyo (JP)

(72) Inventors: Ryohsuke Kawasaki, Tokyo (JP); Takahiro Konishi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/378,655

(22) Filed: Oct. 11, 2023

(65) Prior Publication Data

US 2024/0134302 A1 Apr. 25, 2024
US 2024/0231259 A9 Jul. 11, 2024

(30) Foreign Application Priority Data

Oct. 21, 2022 (JP) ................................ 2022-169433

(51) Int. Cl.
*G03G 15/16* (2006.01)

(52) U.S. Cl.
CPC ................................ *G03G 15/1615* (2013.01)

(58) Field of Classification Search
CPC ........... G03G 15/1605; G03G 15/1615; G03G 21/168; G03G 2215/0129; G03G 2215/0193
See application file for complete search history.

(56) References Cited

U.S. PATENT DOCUMENTS

2011/0293312 A1* 12/2011 Mimbu .............. G03G 15/1645 399/88
2015/0043928 A1 2/2015 Konishi et al.
2015/0050080 A1 2/2015 Morita et al.
2015/0346643 A1 12/2015 Konishi et al.
2015/0346651 A1 12/2015 Nagata et al.
2017/0010566 A1 1/2017 Kato et al.
2020/0064765 A1 2/2020 Suga et al.
2020/0133172 A1 4/2020 Konishi et al.
2021/0261367 A1 8/2021 Kawasaki
2023/0090307 A1 3/2023 Konishi

FOREIGN PATENT DOCUMENTS

JP 2011-248270 A 12/2011

OTHER PUBLICATIONS

U.S. Appl. No. 18/196,446, filed May 12, 2023.
U.S. Appl. No. 18/332,195, filed Jun. 9, 2023.
U.S. Appl. No. 18/208,890, filed Jun. 13, 2023.

* cited by examiner

*Primary Examiner* — Hoang X Ngo
(74) *Attorney, Agent, or Firm* — XSENSUS LLP

(57) ABSTRACT

A pressing device includes a pressed unit, a pressing member, a support shaft, and a drive transmission mechanism. The pressed unit is supported to be rotatable. The pressing member presses the pressed unit. The support shaft supports the pressing member such that the pressing member is rotatable. The drive transmission mechanism transmits a drive force of a drive source to the pressed unit, is disposed on the pressing member, and includes a pressing-member-side drive transmission member to transmit the drive force to a unit drive transmission member of the pressed unit. The support shaft is disposed coaxially on a fulcrum of rotation of the pressed unit.

20 Claims, 4 Drawing Sheets

PRESSING DEVICE AND IMAGE FORMING APPARATUS

CROSS-REFERENCE TO RELATED APPLICATION

This patent application is based on and claims priority pursuant to 35 U.S.C. § 119(a) to Japanese Patent Application No. 2022-169433, filed on Oct. 21, 2022, in the Japan Patent Office, the entire disclosure of which is hereby incorporated by reference herein.

BACKGROUND

Technical Field

Embodiments of the present disclosure relate to a pressing device and an image forming apparatus.

Related Art

In the related art, a pressing device is known that includes a nip-forming member, a pressed unit, a pressing member, and a drive transmission mechanism. The nip-forming member contacts an opposing member to form a nip. The pressed unit is supported to be rotatable. The pressing member presses the pressed unit such that the nip-forming member contacts a pressed portion of the pressed unit to contact the opposing member. The drive transmission mechanism transmits a drive force of a drive source to a unit drive transmission member of the pressed unit. The pressing device includes a pressing lever as the pressing member that contacts a lower surface of a second transfer unit as the pressed unit to press the second transfer unit.

SUMMARY

In an embodiment of the present disclosure, there is provided a pressing device that includes a pressed unit, a pressing member, a support shaft, and a drive transmission mechanism. The pressed unit is supported to be rotatable. The pressing member presses the pressed unit. The support shaft supports the pressing member such that the pressing member is rotatable. The drive transmission mechanism transmits a drive force of a drive source to the pressed unit, is disposed on the pressing member, and includes a pressing-member-side drive transmission member to transmit the drive force to a unit drive transmission member of the pressed unit. The support shaft is disposed coaxially on a fulcrum of rotation of the pressed unit.

In another embodiment of the present disclosure, there is provided an image forming apparatus that includes the pressing device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
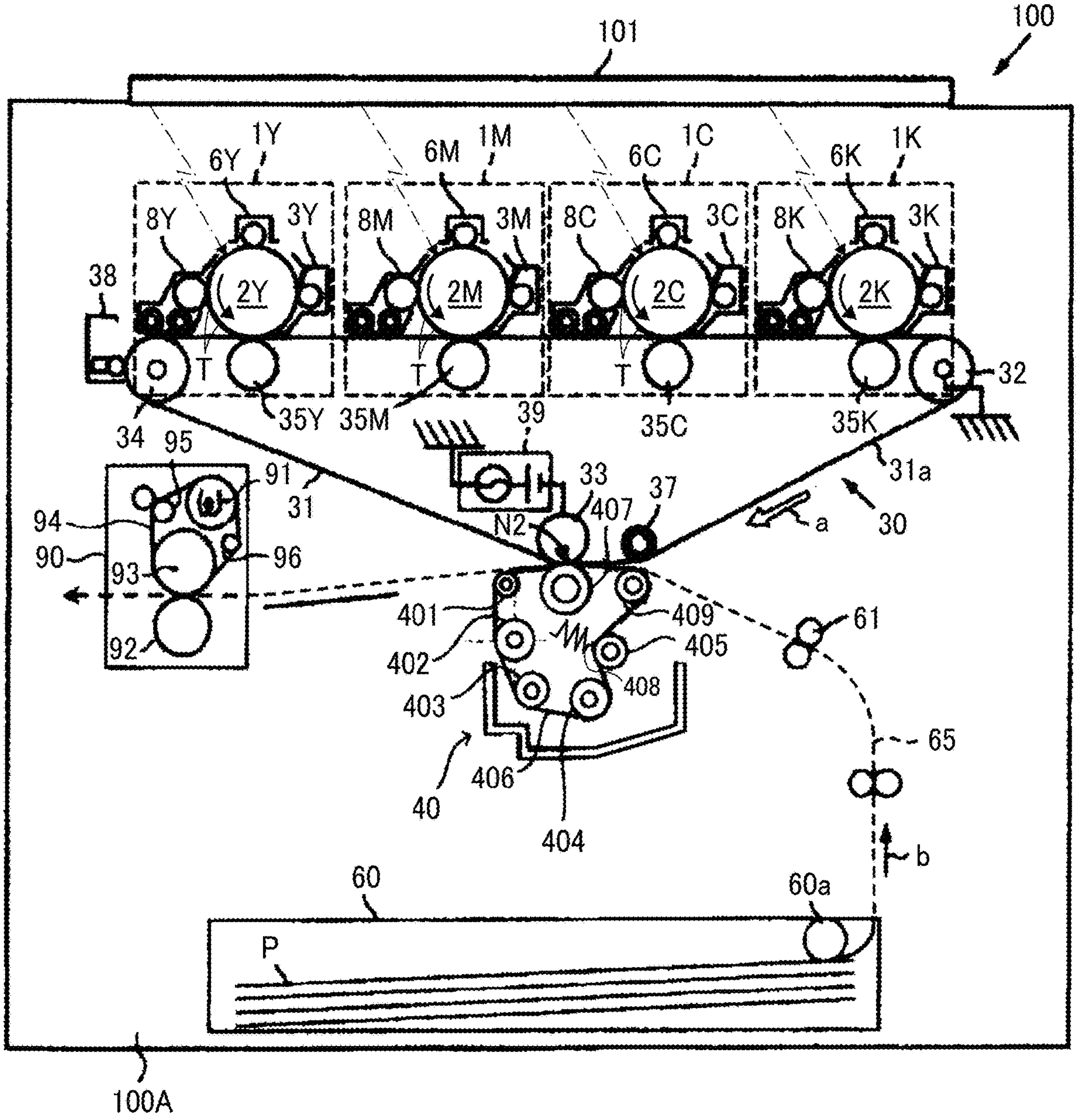
FIG. 1 is a schematic diagram of an electrophotographic color printer as an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

FIG. 1 is a schematic diagram of an electrophotographic color printer 100 that is referred to as a "printer 100" in the following description and serves as an image forming apparatus, according to an embodiment of the present disclosure. A printer 100 includes four image forming units 1Y, 1M, 1C, and 1K for forming toner images of colors of yellow (Y), magenta (M), cyan (C), and black (K), respectively. The printer 100 also includes an intermediate transfer unit 30 as an image bearer unit, a secondary transfer unit 40 as a transfer unit, a sheet tray 60 for storing a sheet P as a recording material (recording medium), and a fixing device 90.

The four image forming units 1Y, 1M, 1C, and 1K form an image forming section and use toners of Y, M, C, and K that are different color toners as powder developers. The other components have a similar structure except the color of toner. The image forming units 1Y, 1M, 1C, and 1K include drum-shaped photoconductors 2Y, 2M, 2C, and 2K serving as latent image bearers, photoconductor cleaners 3Y. 3M, 3C, and 3K, dischargers, charging devices 6Y, 6M, 6C, and 6K, and developing devices 8Y, 8M, 8C, and 8K, respectively.

The surfaces of the photoconductors 2Y, 2M, 2C, and 2K are uniformly charged by the charging devices 6Y, 6M, 6C, and 6K. Subsequently, the surfaces of the photoconductors 2Y, 2M, 2C, and 2K are optically scanned by exposure light such as the laser beams emitted from an optical writing unit 101 disposed above the image forming units 1Y, 1M, 1C, and 1K to form electrostatic latent images of yellow, magenta, cyan, and black images. The developing devices 8Y, 8M, 8C, and 8K that have yellow (Y), magenta (M), cyan (C), and black (K) toners, respectively, develop the electrostatic latent images on the photoconductors 2Y, 2M, 2C, and 2K into visible multicolor toner images T. The toner images T on the photoconductors 2Y, 2M, 2C, and 2K are primarily transferred and borne on an outer circumferential surface (on a side of the outer surface layer) of an intermediate transfer belt 31 as an endless belt.

The intermediate transfer unit 30 is disposed below the image forming units 1Y, 1M, 1C, and 1K and drives to rotate the intermediate transfer belt 31 clockwise in FIG. 1 while stretching the intermediate transfer belt 31. In the present embodiment, a direction of rotation of the intermediate transfer belt 31 is referred to as a "belt travel direction" indicated by a white arrow a in FIG. 1.

The intermediate transfer unit 30 includes, in addition to the intermediate transfer belt 31, a drive roller 32, a secondary transfer backup roller 33, a cleaning backup roller 34, four primary transfer rollers 35Y, 35M, 35C, and 35K, and a pre-transfer roller 37. The intermediate transfer belt 31 is looped around, supported by, and stretched between the drive roller 32, the secondary transfer backup roller 33, the cleaning backup roller 34, the four primary transfer rollers 35Y, 35M, 35C, and 35K, and the pre-transfer rollers 37. The intermediate transfer belt 31 is driven by a drive force by the drive roller 32, which is driven to rotate clockwise in FIG. 1 by a driver such as a drive motor, moves clockwise as an endless belt, and is conveyed.

The secondary transfer unit 40 including a secondary transfer belt 406 that is an endless belt as a transferor is disposed below the outside of the loop of the intermediate transfer belt 31. The secondary transfer belt 406 is looped around a separation roller 401, driven rollers 402 and 403, a drive roller 404, a tension roller 405, a skew prevention roller 409, and a secondary transfer roller 407. The secondary transfer unit 40 may include, for example, a cleaner and a lubricant applicator.

The tension roller 405 is disposed at a region of the secondary transfer belt 406 where the secondary transfer belt 406 is stretched between the drive roller 404 and the skew prevention roller 409, and presses the region toward the inside of the loop by a biasing force of a spring 408. The region of the secondary transfer belt 406 that is stretched by the drive roller 404 and the skew prevention roller 409 is pressed in a manner recessed toward the inside of the loop of the secondary transfer belt 406 due to the pressing of the tension roller 405. As a result, the winding angle of the secondary transfer belt 406 to the drive roller 404 and the winding angle of the secondary transfer belt 406 to the skew prevention roller 409 can be set to 90° or more.

The sheet tray 60 that is a container to store a bundle of multiple sheets P is disposed below the secondary transfer unit 40 in FIG. 1. In the sheet tray 60, a roller 60*a* contacts an uppermost recording medium P of the bundle of recording media. The roller 60*a* is driven to rotate at a specified timing to feed the recording medium P from the sheet tray 60 to a conveyance passage 65 toward a secondary transfer nip N2. A registration roller pair 61 feeds the recording medium P fed in the conveyance passage 65 to the secondary transfer nip N2 at a timing that the recording medium P coincides with the toner image on the outer circumferential surface of the intermediate transfer belt 31.

A toner image on the outer circumferential surface of the intermediate transfer belt 31 is collectively transferred onto the recording medium P by a secondary transfer electric field and a nip pressure in the secondary transfer nip N2, thereby forming a full-color toner image in combination with the white color of the recording medium P.

The fixing device 90 is disposed downstream from the secondary transfer nip N2 in a sheet conveyance direction b (in a conveyance direction of the recording medium P). As illustrated in FIG. 1, the fixing device 90 includes a heating roller 91, a fixing roller 93, a support roller 96, and a tension roller 95, serving as support rollers for a fixing belt 94. The fixing device 90 also includes a pressing roller 92 that contacts the fixing roller 93 with the fixing belt 94 interposed therebetween. The recording medium P to which the toner image has been transferred is fed to the fixing device 90 and is nipped at a fixing nip at which the fixing roller 93 and the pressing roller 92 contact each other. The fixing device 90 transfers heat from the heating roller 91 that includes a heat source therein to the recording medium P via the fixing belt 94. The heat and pressure in the fixing nip soften and fix the toner in the full-color toner image onto the recording medium P. After the toner image is fixed on the sheet P, the sheet P is ejected from the fixing device 90 and ejected outside of the image forming apparatus.

Figure 2:
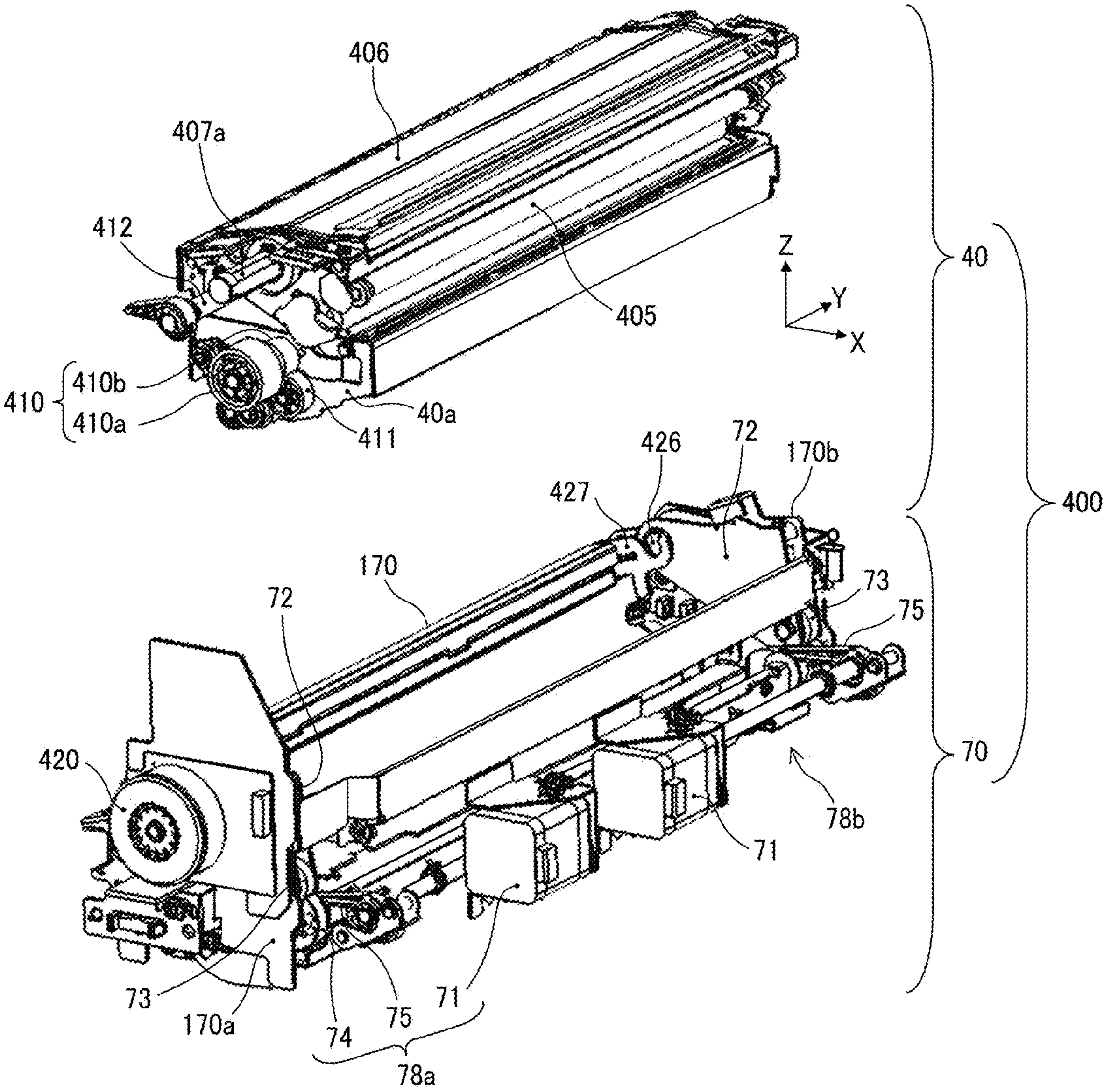
FIG. 2 is a perspective view of a secondary transfer device as a pressing device, according to an embodiment of the present disclosure.
Figure 3:
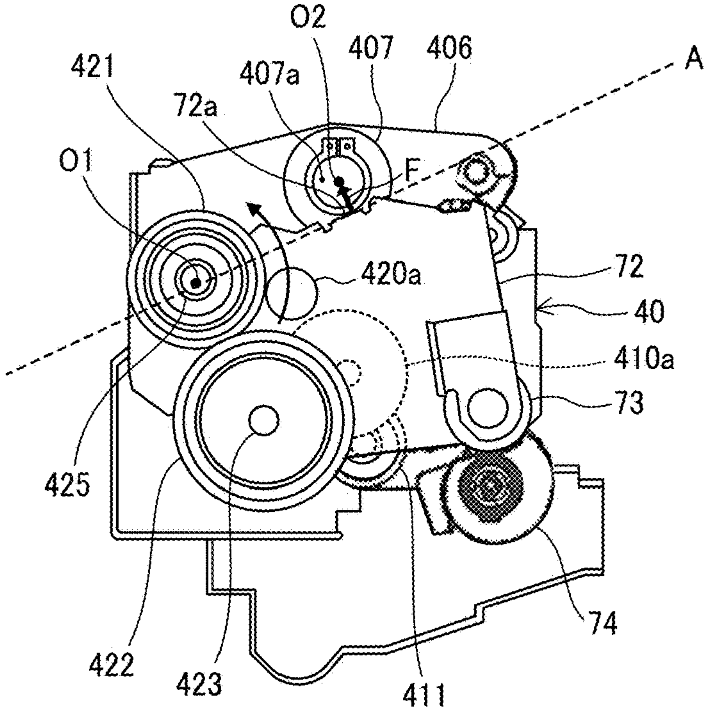
FIG. 3 is a schematic front view of a near side of the secondary transfer device of FIG. 2, according to an embodiment of the present disclosure.
Figure 4:
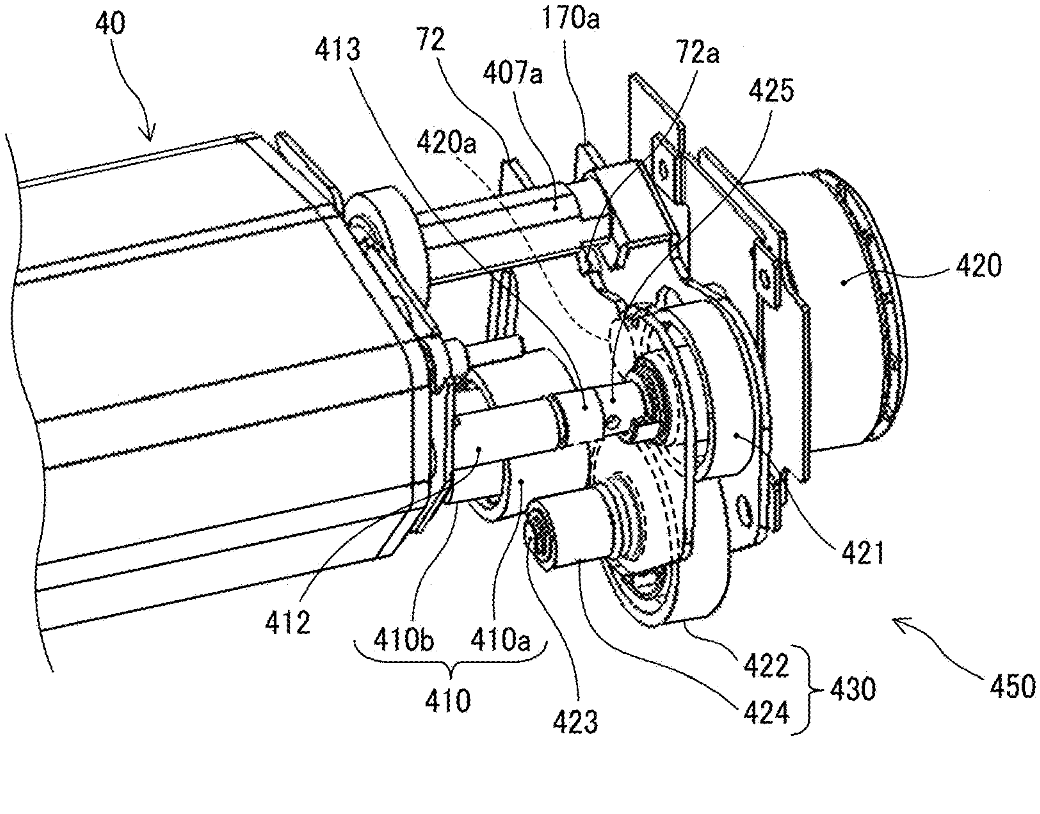
FIG. 4 is a perspective view of a roller drive transmission mechanism according to an embodiment of the present disclosure.

FIG. 2 is a perspective view of a secondary transfer device 400 as a pressing device, according to the present embodiment. FIG. 3 is a schematic front view of a near side of the secondary transfer device 400, according to the present embodiment. FIG. 4 is a perspective view of a roller drive transmission mechanism 450 according to an embodiment of the present disclosure. As illustrated in FIG. 2, the secondary transfer device 400 includes the secondary transfer unit 40 as a pressed unit and a pressing unit 70. A secondary transfer motor 420 serving as a drive source for driving to rotate the secondary transfer belt 406 is disposed in a side plate 170*a* on the near side of the pressure frame 170 of the pressing unit 70 on the near side in FIG. 2. A secondary-transfer two-stage gear 410 as a unit drive transmission member is rotatably supported by a side plate 40*a* on the near side in FIG. 2 of the secondary transfer unit 40. An output gear 411 disposed on a shaft of the drive roller 404 (see FIG. 1) meshes with a small-diameter gear portion 410*b* of the secondary-transfer two-stage gear 410. A large-diameter gear portion 410*a* of the secondary-transfer two-stage gear 410 meshes with an in-arm output gear 424 (see FIG. 4) disposed on a pressing arm 72 to be described below.

The pressing unit 70 is provided with the pressing arms 72 as a pair of pressing members that contact a core-metal portion 407*a* that rotatably supports the secondary transfer roller 407. The pressing arms 72 are disposed inward from the side plates 170*a* and 170*b* of the pressure frame 170 in the axis direction. The pressing arm on the far side in FIG. 2 is rotatably supported by a support shaft 426 disposed in the side plate 170*b* on the far side. The pressing arm on the near side in FIG. 2 is rotatably supported by a support shaft 425 disposed on the side plate 170*a* on the near side (see FIG. 4).

The pressing unit 70 includes a first pressing drive device 78*a* that rotates the pressing arm 72 on the near side in FIG. 2 and a second pressing drive device 78*b* that rotates the pressing arm on the far side in the drawing. The first pressing drive device 78*a* and the second pressing drive device 78*b* have the same configuration. A pressing motor 71 serving as a pressing drive source of each pressing drive device is disposed near the center in the axis direction. A drive force of the pressing motor 71 is transmitted to a pressing cam 74 serving as a cam via a timing belt 75. The pressing cam 74 contacts a cam receiving roller 73 disposed near a lower portion of the pressing arm 72 opposite to the support shafts.

The secondary transfer unit 40 is moved vertically downward to be assembled to the pressing unit 70. At this time, the far side of a connecting shaft 412 of the secondary transfer unit 40 is supported by a groove 427 fixed to the support shaft 426 on the far side that rotatably supports the pressing arm 72 on the far side. On the other hand, a near side end of the connecting shaft 412 is inserted into a connecting hole member 413 attached to a tip of the support shaft 425 on which the pressing arm 72 on the near side is rotatably supported and is supported by the connecting hole member 413. As a result, the connecting shaft 412 is placed coaxially with the support shafts 425 and 426 of the pressing unit 70. The fulcrum of rotation of the secondary transfer unit 40 and the fulcrum of rotation of the pressing arm 72 are placed coaxially with each other.

When the secondary transfer unit 40 is assembled to the pressing unit 70, the far side and the near side of the core-metal portion 407*a* of the secondary transfer roller 407 contact a contact portion 72*a* of the pressing arm 72 and are supported.

As illustrated in FIG. 3, the pressing arm 72 is disposed facing the side plate 40*a* of the secondary transfer unit 40 and is housed in the secondary transfer unit 40 as viewed in the axis direction. As a result, the secondary transfer device 400 can be miniaturized.

In the present embodiment, various types of sheet P are used, such as plain paper, thick paper, a postcard, an envelope, thin paper, coated paper (such as coated paper and art paper), tracing paper, and an overhead projector (OHP) sheet. The optimum secondary transfer pressure (nip pressure) varies according to the type of sheet P. Accordingly, in the present embodiment, the secondary transfer pressure is adjusted according to the type of recording material. For example, a user operates an operation panel included in the body of the printer to input information on the type of sheet P set in the sheet tray 60. The controller of the printer 100 according to the present embodiment sets the driving time of the pressing motor 71 based on the input information on the type of the sheet P. When the pressing motor 71 is a stepping motor, the number of steps is set based on input information on the type of the sheet P.

The pressing motor 71 is driven for the set drive time (or in the set number of steps). The position in the rotation direction of the pressing cam 74 that contacts the cam receiving roller 73 turns to a position corresponding to the type of sheet, and the pressing force of the pressing arm 72 against the core-metal portion 407*a* is adjusted corresponding to the type of sheet. As a result, the force acting on the secondary transfer nip is adjusted to a force corresponding to the type of sheet, and is a secondary transfer pressure corresponding to the type of sheet.

As illustrated in FIGS. 3 and 4, the secondary transfer device 400 includes the roller drive transmission mechanism 450 serving as a drive transmission mechanism that transmits a drive force of the secondary transfer motor 420 to the secondary-transfer two-stage gear 410 of the secondary transfer unit 40 on one side in the axis direction. The roller drive transmission mechanism 450 includes a pressure-side idler gear 421 serving as a first drive transmission member that meshes with a motor gear 420*a* of the secondary transfer motor 420, and an in-arm gear portion 430 disposed in the pressing arm 72. The pressure-side idler gear 421 is disposed between the pressing arm 72 and the side plate 170*a* on the near side of the pressure frame 170 and is rotatably supported by the support shaft 425.

The in-arm gear portion 430 includes an in-arm input gear 422 and the in-arm output gear 424 serving as a pressing-member-side drive transmission member. The in-arm input gear 422 and the in-arm output gear 424 are attached to a through shaft 423 that penetrates the pressing arm 72 and is rotatably supported by the pressing arm 72. The in-arm input gear 422 is attached near the secondary transfer motor 420 with the pressing arm 72 of the through shaft 423 interposed therebetween, and meshes with the pressure-side idler gear 421. The in-arm output gear 424 is attached near the secondary transfer unit 40 with the pressing arms 72 of the through shafts 423 interposed therebetween, and meshes with the large-diameter gear portion 410*a* of the secondary-transfer two-stage gear 410 of the secondary transfer unit 40.

In the present embodiment, the pressure-side idler gear 421 that meshes with the in-arm input gear 422 disposed on the pressing arm 72 is disposed on the support shaft 425 that is the fulcrum of rotation of the pressing arm 72. Even when the pressing arm 72 rotates, the distance between the rotation centers of the pressure-side idler gear 421 and the in-arm input gear 422 does not change. Thus, preferable meshing between the in-arm input gear 422 and the pressure-side idler gear 421 can be maintained. As a result, even if the pressing arm 72 rotates, the drive force of the secondary transfer motor 420 can be properly transmitted from the pressure-side idler gear 421 to the in-arm input gear 422.

In the present embodiment, the connecting shaft 412 that is the fulcrum of the rotation of the secondary transfer unit 40 is connected to the support shaft 425, and the rotation fulcrum of the secondary transfer unit 40 and the rotation fulcrum of the pressing arm 72 are placed on the same axis. The secondary transfer unit 40 basically rotates together with the pressing arm 72. When the secondary transfer unit 40 rotates together with the pressing arm 72, the distance between rotation centers of the in-arm output gear 424 and the secondary-transfer two-stage gear 410 does not change. Due to such a configuration, preferable meshing between the in-arm output gear 424 and the large-diameter gear portion 410*a* of the secondary-transfer two-stage gear 410 can be maintained. As a result, when the secondary transfer unit 40 rotates with the pressing arm 72, the drive force of the secondary transfer motor 420 can be transmitted properly from the in-arm output gear 424 to the large-diameter gear portion 410*a* of the secondary-transfer two-stage gear 410.

In order to apply a specified torque to the drive roller 404 of the secondary transfer unit 40, the rotation speed of the secondary transfer motor 420 is reduced to transmit a drive force to the output gear 411. In order to achieve a desired reduction ratio with one stage, the output-side gear may be too large. Thus, the size of the apparatus may be increased. In the present embodiment, a plurality of staged gears are disposed to perform deceleration in a plurality of stages, thereby preventing an increase in the diameter of each gear.

Specifically, deceleration of the three stages is performed between the motor gear 420*a* and the in-arm input gear 422, between the in-arm output gear 424 and the large-diameter gear portion 410*a* of the secondary-transfer two-stage gear 410, and between the small-diameter gear portion 410*b* of the secondary-transfer two-stage gear 410 and the output gear 411. As a result, an increase in the diameter of each gear can be prevented to achieve a desired deceleration ratio.

The roller drive transmission mechanism 450 according to the present embodiment includes a plurality of gears in the pressing arm 72. This effect is caused by the following reasons. In the present embodiment, as described above, in order to reduce the size of the secondary transfer device 400, the pressing arm 72 faces the secondary transfer unit 40 in the axis direction so that the pressing arm 72 is housed in the secondary transfer unit 40 when viewed in the axis direction. In the present embodiment, in order to reduce the size of an apparatus, the secondary transfer motor 420 is disposed not to protrude from the secondary transfer unit 40 as much as possible when viewed in the axis direction. Accordingly, as illustrated in FIG. 3, the motor gear 420*a* is inevitably placed near the center of the secondary transfer unit 40. As a result, as illustrated in FIG. 3, the motor gear 420*a* faces the pressing arm 72.

The secondary transfer unit 40 is replaced periodically due to, for example, abrasion of the secondary transfer belt 406. Accordingly, the secondary transfer unit 40 is easily attached to and detached from the pressing unit. In the present embodiment, in order to enable the secondary transfer unit 40 to be easily attached to and detached from the pressing unit 70 in the up and down direction of FIG. 2 that is orthogonal to the axis direction, the output gear 411 needs to be disposed inside than the pressing arm 72. This is because, if the output gear 411 is disposed outside the pressing arm 72, a shaft of the drive roller 404 provided with the output gear 411 hits the pressing arm 72, so that the secondary transfer unit 40 cannot be attached to and detached from the pressing unit 70.

Accordingly, the drive force of the secondary transfer motor 420 needs to be transmitted from outside to inside in the axis direction with the pressing arm 72 interposed therebetween. A configuration can be adopted that a gear is disposed in a portion of the support shaft 425 located inside the pressing arm 72 in the axis direction and the drive force of the secondary transfer motor 420 is transmitted from outside to inside in the axis direction with the pressing arm 72 interposed therebetween by using the support shaft 425. However, in such a configuration, a space for disposing a gear on the support shaft 425 needs to be left. The position of the connecting hole member 413 disposed on the support shaft 425 is placed on the inside in the axis direction compared to the configuration illustrated in FIG. 4. As a result, the gap between the pressing arm 72 and the secondary transfer unit 40 turns to be large. Thus, the apparatus increases in size in the axis direction. The number of gears disposed in the secondary transfer unit 40 increases, the cost of the secondary transfer unit 40 increases, and the replacement cost of the secondary transfer unit 40 increases. As a result, maintenance costs of the apparatus may increase.

In a case of adopting a configuration in which the drive force of the secondary transfer motor 420 is transmitted from outside to inside in the axis direction bypassing the pressing arm 72 with the pressing arm 72 interposed therebetween, the gear protrudes from the secondary transfer unit 40 when viewed in the axis direction. Thus, the apparatus may increase in size.

On the other hand, in the present embodiment, the pressing arm 72 is provided with the in-arm gear portion 430 including a plurality of gears, and the drive force of the secondary transfer motor 420 is transmitted by the in-arm gear portion 430 from outside to inside in the axis direction with the pressing arm 72 interposed therebetween. According to this configuration, the pressing arm 72, the secondary transfer motor 420, and the gear of the roller drive transmission mechanism 450 can be housed in the secondary transfer unit 40 when viewed in the axis direction. Thus, an increase in the size of the secondary transfer device 400 can be prevented. As a result, the degree of freedom in the layout of the image forming apparatus to which the secondary transfer device 400 is attached can be increased. The size of the image forming apparatus can be also decreased.

An increase in the number of components of the secondary transfer unit 40 can be prevented, an increase in the weight of the secondary transfer unit 40 can be prevented, and the secondary transfer unit 40 can be easily attached and detached in the vertical direction. Accordingly, workability in replacement of the secondary transfer unit 40 can be enhanced. An increase in the cost of the secondary transfer unit 40 can be reduced, and the maintenance cost of the apparatus can be reduced.

In the present embodiment, a large excess space is provided below between the side plate 170*a* on the near side of the pressure frame 170 and the pressing arm 72. The in-arm input gear 422 can be placed in the excess space and can be larger in diameter without protruding from the secondary transfer unit 40 when viewed in the axis direction. Accordingly, a large deceleration ratio can be obtained between the motor gear 420*a* and the in-arm input gear 422.

The rotation fulcrums of the pressure-side idler gear 421, the pressing arm 72, and the secondary transfer unit 40 are disposed on the same axis to maintain preferable meshing of gears even if the pressing arm 72 and the secondary transfer unit 40 rotate as described above. Accordingly, the drive force of the secondary transfer motor 420 can be properly transmitted to the output gear 411.

In the present embodiment, as illustrated in FIG. 3, the contact portion 72*a* that contacts the core-metal portion 407*a* of the secondary transfer roller 407 of the pressing arm 72 is flat. The contact portion 72*a* substantially overlaps a broken line A connecting between an axis center O1 of the support shaft 425, which is the rotation center of the pressing arm 72 illustrated in FIG. 3, and a contact position between the contact portion 72*a* and the core-metal portion 407*a*. Specifically, the angle formed by the broken line A and the direction of the pressing force F applied to the core-metal portion 407*a* of the pressing arm 72 is set to be 90°±10°.

When the position of the core-metal portion 407*a* of the secondary transfer roller 407 deviates from the target position due to variation in components, such a configuration can prevent the deviation from greatly affecting the meshing of the in-arm output gear 424 and the large-diameter gear portion 410*a* of the secondary-transfer two-stage gear 410. Some embodiments of the present disclosure are described below with reference to the drawings.

Figure 5A:
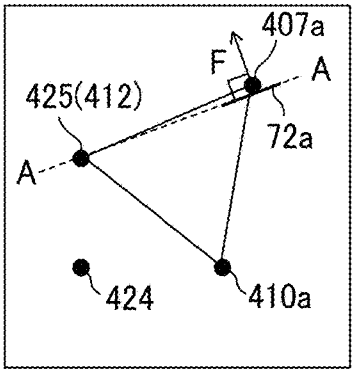
FIGS. 5A to 5F are diagrams each illustrating a positional relationship between an in-arm output gear and a large-diameter gear portion of a secondary-transfer two-stage gear when a secondary transfer roller is displaced, according to an embodiment of the present disclosure.
Figure 5B:
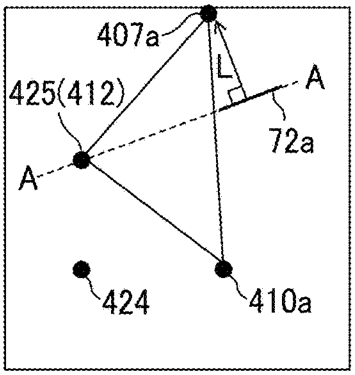
Figure 5C:
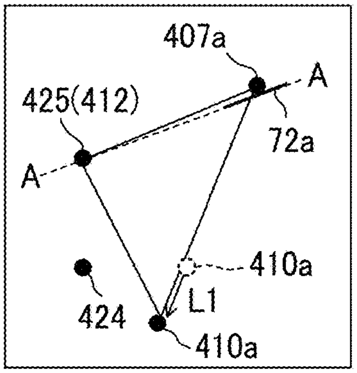
Figure 5D:
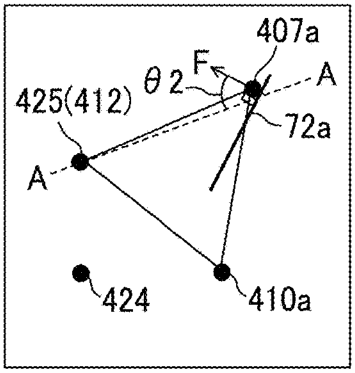
Figure 5E:
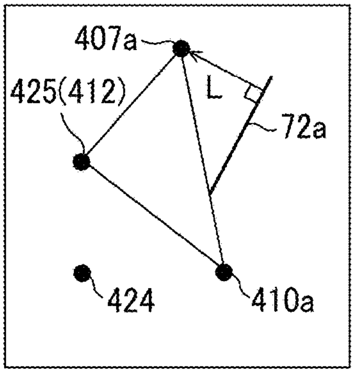
Figure 5F:
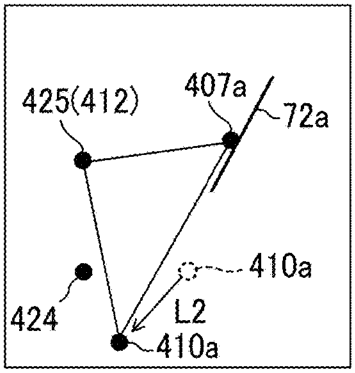

FIGS. 5A to 5C are diagrams each illustrating a positional relationship between the in-arm output gear 424 and the large-diameter gear portion 410*a* of the secondary-transfer two-stage gear 410 when the position of the core-metal portion 407*a* of the secondary transfer roller 407 is shifted, according to an example of the present disclosure. FIGS. 5D to 5F are diagrams each illustrating a positional relationship between the in-arm output gear 424 and the large-diameter gear portion 410*a* of the secondary-transfer two-stage gear 410 when the position of the core-metal portion 407*a* of the secondary transfer roller 407 is shifted, according to a comparative example of the present disclosure. FIGS. 5A to 5F are simplified diagrams of the positional relationship among the support shaft 425, the core-metal portion 407*a*, the contact portion 72*a* of the pressing arm, the in-arm output gear 424, and the large-diameter gear portion 410*a* of the secondary-transfer two-stage gear 410.

In the comparative example illustrated in FIGS. 5D to 5F, the contact portion 72*a* is inclined with respect to a line segment A connecting between the axis center of the support shafts 425 and the contact position of the contact portion 72*a* and the core-metal portion 407*a*. An angle θ2 formed by the line segment A and the pressure direction of the pressing force F applied to the core-metal portion 407*a* of the pressing arm 72 is outside the range of 90°±10°.

A case is considered where the position of the core-metal portion 407*a* of the secondary transfer roller 407 is shifted from the ideal position illustrated in FIG. 5A by L mm in a direction perpendicular to the planar contact portion 72*a* as illustrated in FIG. 5B. This is because a positional relationship between the in-arm output gear 424 and the of the large-diameter gear portion 410*a* of the secondary-transfer two-stage gear 410 changes the most when the core-metal portion 407*a* is displaced in a direction perpendicular to the contact portion 72*a.*

In a case where the position of the core-metal portion 407*a* of the secondary transfer roller 407 is shifted from an ideal position as illustrated in FIG. 5B, the secondary transfer roller 407 is contacted to the intermediate transfer belt 31 via the secondary transfer belt 406 to rotate the secondary transfer unit 40. As a result, the posture of the secondary transfer unit 40 is inclined with respect to a posture in which the position of the core-metal portion 407*a* of the secondary transfer roller 407 is at an ideal position. As a result, the position of the large-diameter gear portion 410*a* of the secondary-transfer two-stage gear 410 changes as illustrated in FIG. 5C.

On the other hand, when the secondary transfer roller 407 contacts the intermediate transfer belt 31 via the secondary transfer belt 406, as can be seen from a comparison between FIGS. 5A and 5C, the secondary transfer roller 407 (the core-metal portion 407*a*) is placed at the same specified position as when the core-metal portion 407*a* of the secondary transfer roller 407 is at the ideal position in the rotation direction of the secondary transfer unit 40.

The pressing arm 72 contacts the core-metal portion 407*a* of the secondary transfer roller 407 located at a specified position in the rotation direction of the secondary transfer unit 40. Thus, the pressing arm 72 is in the same position as when the core-metal portion 407*a* of the secondary transfer roller 407 is located at the ideal position. As a result, the position of the in-arm output gear 424 does not change even if the position of the core-metal portion 407*a* of the secondary transfer roller 407 is shifted from the ideal position. As a result, in a case where the position of the secondary transfer roller 407 (the core-metal portion 407*a* thereof) deviates from an ideal position, the deviation affects meshing between the in-arm output gear 424 and the large-diameter gear portion 410*a* of the secondary-transfer two-stage gear 410.

In order to deal with such a situation, the pressing arm 72 may be contacted to a portion other than the core-metal portion 407*a* of the secondary transfer roller 407. However, in this case, a variation in the contact pressure of the secondary transfer roller 407 against the intermediate transfer belt 31 when the position of the core-metal portion 407*a* of the secondary transfer roller 407 deviates from the ideal position increases. As compared with the case of pressing the core-metal portion 407*a*, a component tolerance also increases, and a variation in the contact pressure of the secondary transfer roller 407 to the intermediate transfer belt 31 increases. As a result, control of the pressing force by the rotation position of the pressing cam may not be performed accurately, which is not preferable.

As can be seen from a comparison between FIGS. 5C and 5F, in the present embodiment in which the angle that the line segment A forms with the pressure direction of the pressing arm 72 is 90° when the pressing arm 72 contacts the core-metal portion 407*a*, the shift amount of the large-diameter gear portion 410*a* from the ideal meshing position in a case where the position of the core-metal portion 407*a* of the secondary transfer roller 407 is shifted by L mm in the vertical direction of the contact portion 72*a* from the ideal position is reduced relative to the comparative example (L1<L2). Accordingly, when the position of the secondary transfer roller 407 (core-metal portion 407*a* thereof) deviates from the ideal position, the deviation can be prevented from greatly affecting the meshing of the in-arm output gear 424 and the large-diameter gear portion 410*a* of the secondary-transfer two-stage gear 410, as compared with the comparative example in which the contact portion 72*a* does not overlap the line A connecting the axis center of the support shaft 425 and the contact position between the contact portion 72*a* and the core-metal portion 407*a* and the angle formed by the line segment A and the pressure direction is outside the range of 90°±10°.

In FIG. 5A, the contact portion 72*a* overlaps a line A connecting an axis center of the support shafts 425 and the contact position between the contact portion 72*a* and the core-metal portion 407*a*, and the direction in which the contact portion 72*a* applies a force to the core-metal portion 407*a* is orthogonal (90°) to the line A. However, a range of ±10° is an error range with respect to an angle of 90° formed by the line A and the direction in which the contact portion 72*a* applies a force to the core-metal portion 407*a*. In other words, when the angle is 90°±10°, a deviation of the position of the secondary transfer roller 407 (the core-metal portion 407*a* thereof) from the ideal position can be prevented from greatly affecting the meshing of the in-arm output gear 424 and the large-diameter gear portion 410*a* of the secondary-transfer two-stage gear 410 to substantially the same degree as in a case where the angle formed by the pressure direction and the line A is 90°.

As in the present embodiment, the contact portion 72*a* overlaps the line A connecting the axis center O1 of the support shafts 425 and the contact position of the contact portion 72*a* and the core-metal portion 407*a*. Thus, the following effects can be obtained. In other words, the above-described configuration has an advantageous effect that the force can be transmitted most efficiently from the pressing arm 72 to the core-metal portion 407*a* of the secondary transfer roller 407.

Figure 6A:
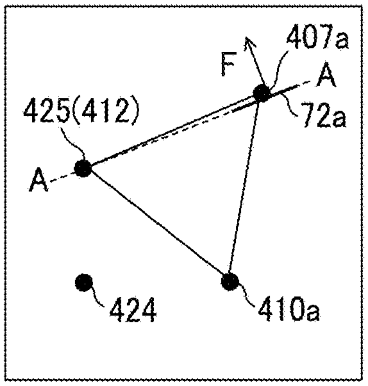
FIG. 6A is a diagram illustrating the direction of the force applied from a contact portion of a pressing arm to a core-metal portion according to an embodiment of the present disclosure.
Figure 6B:
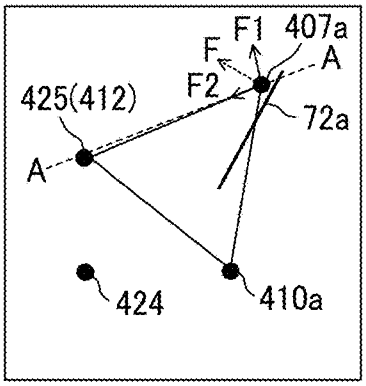
FIG. 6B is a diagram illustrating the directions of the force applied from a contact portion of a pressing arm to a core-metal portion, according to a comparative example of the present disclosure.

FIG. 6A is a diagram illustrating the direction of a force applied from the contact portion 72*a* of the pressing arm 72 to the core-metal portion 407*a*, according to the present embodiment. FIG. 6B is a diagram illustrating the direction of a force applied from the contact portion 72*a* of the pressing arm 72 to the core-metal portion 407*a*, according to a comparative example of the present disclosure.

As illustrated in FIG. 6B, in the comparative example in which the contact portion 72*a* is inclined with respect to a line segment A connecting between the axis center of the support shaft 425 and the contact position between the contact portion 72*a* and the core-metal portion 407*a*, the force F applied to the core-metal portion 407*a* is decomposed into a force F1 in the rotation direction and a force F2 in the radial direction. As a result, loss of force occurs.

On the other hand, as illustrated in FIG. 6A, in the present embodiment, all of the force F applied to the core-metal portion 407*a* turns to a force in the rotation direction, and the force from the pressing arm 72 can be transmitted to the secondary transfer roller 407 most efficiently.

In the present embodiment, the secondary-transfer two-stage gear 410 is disposed in the secondary transfer unit 40. The secondary-transfer two-stage gear 410 may be disposed in the pressing arm 72. With such a configuration, the number of components of the secondary transfer unit 40 can be further reduced, cost reduction of the secondary transfer unit 40 can be achieved, and replacement cost of the secondary transfer unit 40 can be reduced. As a result, the maintenance cost of the apparatus can be reduced.

A description is given of the preferable embodiment of the present disclosure below. The present disclosure is not limited to such a specific embodiment. Unless particularly limited in the above description, various modifications and changes can be made within the scope of the gist of the present disclosure described in the claims.

For example, the image forming apparatus may not be the printer 100 but may be a copier, a stand-alone facsimile, or a multifunction peripheral including at least two of the functions of the copier, the printer 100, the facsimile, and the scanner. The belt device is not limited to the secondary transfer belt device, and is applicable to various belt devices.

The above-described embodiments are given as examples, and, for example, the following aspects of the present disclosure may have advantageous effects described below.

First Aspect

In the first aspect, a pressing device (e.g., the secondary transfer device 400) includes a pressed unit (e.g., the secondary transfer unit 40), a pressing member (e.g., the pressing arm 72), and a drive transmission mechanism (e.g., the roller drive transmission mechanism 450). The pressed unit is supported to be rotatable. The pressing member presses the pressed unit. The drive transmission mechanism transmits a drive force of a drive source (e.g., the secondary transfer motor 420). The drive transmission mechanism includes a pressing-member-side drive transmission member (e.g., the in-arm output gear 424) that is disposed on the pressing member and transmits the drive force to a unit drive transmission member (e.g., the secondary-transfer two-stage gear 410) of the pressed unit. A support shaft (e.g., the support shaft 425) is disposed coaxially on a fulcrum of rotation of the pressed unit. According to this configuration, the pressing-member-side drive transmission member that transmits drive force to the unit drive transmission member is disposed on the pressing member, so that the number of drive transmission members disposed in the pressed unit can be reduced, and an increase in the number of components of the pressed unit can be prevented. Accordingly, in a case where the pressed unit is attachable to and detachable from a pressing unit or a body of an apparatus including the pressing unit, weight reduction and cost reduction of the pressed unit as an attachable and detachable unit can be achieved. The support shafts on which the pressing member is rotatably supported are disposed coaxially with the fulcrum of rotation of the pressed unit, so that the distance from the fulcrum of rotation of the pressed unit to the rotation center of the pressing-member-side drive transmission member does not change with the rotation of the pressing member. As a result, when the pressed unit rotates with the pressing member by a pressing force of the pressing member, the distance from the rotation center of the pressing-member-side drive transmission member to the rotation center of the unit drive transmission member does not change. Accordingly, a state of contact between the pressing-member-side drive transmission member and the unit drive transmission member can be maintained, and the drive force can be transmitted properly from the pressing-member-side drive transmission member to the unit drive transmission member.

Second Aspect

In the second aspect, in the pressing device (e.g., the secondary transfer device 400) according to the first aspect, as viewed in an axis direction of the support shaft (e.g., the support shaft 425), an angle formed by a line passing through an axis center of the support shaft and a contact portion between the pressed unit (e.g., the secondary transfer unit 40) and the pressing member (e.g., the pressing arm 72) and a pressure direction of the pressing member to the pressed unit is 80° or more and 100° or less. According to this configuration, as described with reference to FIG. 3 and FIGS. 5A to 5F, variations of a state of contact between the unit drive transmission member (e.g., the secondary-transfer two-stage gear 410) and the pressing-member-side drive transmission member (e.g., the in-arm output gear 424) can be reduced when the pressed portion (e.g., the core-metal portion 407*a*) that receives a pressing force from the pressing member of the pressed unit deviates from the target position due to variations in components. As a result, an adverse effect on drive transmission can be reduced. As described with reference to FIGS. 6A and 6B, the force from the pressing member can be transmitted efficiently to the pressed unit.

Third Aspect

In the third aspect, in the pressing device (e.g., the secondary transfer device 400) according to the second aspect, the pressing member (e.g., the pressing arm 72) includes a pressing portion (e.g., the contact portion 72*a*) that presses the pressed portion (e.g., the core-metal portion 407*a*) of the pressed unit (e.g., the secondary transfer unit 40), any one of the pressing portion (e.g., the contact portion 72*a*) and the pressed portion has a linear shape overlapping the line passing through the axis center of the support shaft (e.g., the support shaft 425) and the contact portion between the pressed portion and the pressing portion when viewed in the axis direction. According to this configuration, as described with reference to FIGS. 3 and FIGS. 5A to 5F, an angle formed between a line passing through the axis center of the support shafts and the contact portion of the pressed portion and the pressing member (broken line A illustrated in FIGS. 3 and FIGS. 5A to 5F) and the pressure direction in which the pressing member presses the pressed portion can be substantially 90° w % ben viewed in the axis direction.

Fourth Aspect

In the fourth aspect, in the pressing device (e.g., the secondary transfer device 400) according to any one of the first to third aspects, the pressed unit (e.g., the secondary transfer unit 40) includes a nip forming member (e.g., the secondary transfer roller 407) to form a nip with an opposing member (e.g., the intermediate transfer belt 31) facing the pressed unit in a pressure direction of the pressing member (e.g., the pressing arm 72). The pressing member presses the nip-forming member. According to this configuration, as described in the present embodiment, variation in the contact pressure of the nip forming member to the opposing member can be reduced.

Fifth Aspect

In the fifth aspect, in the pressing device (e.g., the secondary transfer device 400) according to any one of the first to fourth aspects, the pressed unit (e.g., the secondary transfer unit 40) includes a connecting shaft (e.g., the connecting shaft 412) connected to the support shaft (e.g., the support shaft 425) and rotates around the connecting shaft as a fulcrum. According to this configuration, as described in the present embodiment, the fulcrum of rotation of the pressed unit and the fulcrum of rotation of the pressing member (e.g., the pressing arm 72) can be coaxial with each other.

Sixth Aspect

In the sixth aspect, the pressing device (e.g., the secondary transfer device 400) according to any one of the first to fifth aspects further includes a pressing force adjustor (e.g., the pressing drive device 78) to adjust a pressing force of the pressing member (e.g., the pressing arm 72) to the pressed unit (e.g., the secondary transfer unit 40). According to this configuration, as described in the present embodiment, the pressing force to be applied to the pressed unit can be adjusted.

Seventh Aspect

In the seventh aspect, in the pressing device (e.g., the secondary transfer device 400) according to the sixth aspect, the pressing force adjustor (e.g., the pressing drive device 78) includes a cam (e.g., the pressing cam 74) that contacts the pressing member (e.g., the pressing arm 72) and a pressing drive source (e.g., the pressing motor 71). According to this configuration, as described in the present embodiment, the driving time of the pressing drive source is controlled to change the position in the rotation direction of the cam that contacts the pressing member, and adjust the pressure force of the pressing member to the pressed unit (e.g., the secondary transfer unit 40).

Eighth Aspect

In the eighth aspect, the pressing device (e.g., the secondary transfer device 400) according to any one of the first to seventh aspects, the drive transmission mechanism (e.g., the roller drive transmission mechanism 450) is a gear transmission mechanism having a plurality of deceleration stages. According to this configuration, as described in the present embodiment, an increase in the diameter of each gear serving as a drive transmission member is prevented to achieve a desired deceleration ratio. A decrease in meshing accuracy of the gears can be prevented by adopting the configurations of the first aspect or the second aspect.

Ninth Aspect

In the ninth aspect, in the pressing device (e.g., the secondary transfer device 400) according to any one of the first to eighth aspects, the drive transmission mechanism (e.g., the roller drive transmission mechanism 450) includes a first drive transmission member (e.g., the pressure-side idler gear 421) that receives a drive force from the drive source (e.g., the secondary transfer motor 420) and transmits the drive force to a drive transmission member (in the present embodiment, an in-arm input gear 422) disposed on the pressing member (e.g., the pressing arm 72). The first drive transmission member is disposed coaxially on the support shaft (e.g., the support shaft 425). According to this configuration, as described in the present embodiment, even if the pressing member rotates, the distance between the rotation centers of the first drive transmission member and the drive transmission member to which the drive force is transmitted from the first drive transmission member of the pressing member does not change. As a result, even if the pressing member rotates, the state of contact between the first drive transmission member and the drive transmission member of the pressing member can be maintained, and the drive force can be transmitted from the first drive transmission member to the drive transmission member of the pressing member properly.

Tenth Aspect

In the tenth aspect, in the pressing device (e.g., the secondary transfer device 400) according to any one of the first to ninth aspects, the pressing unit is a secondary transfer unit (e.g., the secondary transfer unit 40).

Eleventh Aspect

In the eleventh aspect, an image forming apparatus (e.g., the printer 100) includes the pressing device (e.g., the secondary transfer device 400) according to any one of the first to tenth aspects. According to this configuration, the maintenance cost of the image forming apparatus can be reduced.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A pressing device comprising:

a pressed unit supported to be rotatable;

a pressing member to press the pressed unit;

a support shaft supporting the pressing member such that the pressing member is rotatable; and a drive transmission mechanism to transmit a drive force of a drive source to the pressed unit, the drive transmission mechanism disposed on the pressing member and including a pressing-member-side drive transmission member to transmit the drive force to a unit drive transmission member of the pressed unit, wherein the support shaft is disposed coaxially on a fulcrum of rotation of the pressed unit, and wherein a line passing through an axis center of the support shaft and a contact portion between the pressed unit and the pressing member forms an angle with a pressure direction of the pressing member to the pressed unit such that the angle is 80° or more and 100° or less as viewed in an axis direction of the support shaft.

2. The pressing device according to claim 1, wherein the pressing member includes a pressing portion to press a pressed portion of the pressed unit, and wherein any one of the pressing portion and the pressed portion has a linear shape overlapping the line passing through the axis center of the support shaft and the contact portion between the pressed portion and the pressing portion when viewed in the axis direction.

3. The pressing device according to claim 1, wherein the pressed unit includes a nip forming member to form a nip with an opposing member facing the pressed unit in the pressure direction of the pressing member, and wherein the pressing member presses the nip-forming member.

4. The pressing device according to claim 1, wherein the pressed unit includes a connecting shaft connected to the support shaft and rotates around the connecting shaft as a fulcrum.

5. The pressing device according to claim 1, further comprising a pressing force adjustor to adjust a pressing force of the pressing member to the pressed unit.

6. The pressing device according to claim 5, wherein the pressing force adjustor includes a cam that contacts the pressing member and a pressing drive source to drive the cam to rotate.

7. The pressing device according to claim 1, wherein the drive transmission mechanism is a gear transmission mechanism having a plurality of deceleration stages.

8. The pressing device according to claim 1,
wherein the drive transmission mechanism includes a drive transmission member to receive the drive force from the drive source and transmit the drive force to another drive transmission member disposed on the pressing member, and
wherein the drive transmission member is disposed coaxially on the support shaft.

9. The pressing device according to claim 1,
wherein the pressed unit is a secondary transfer unit.

10. An image forming apparatus comprising the pressing device according to claim 1.

11. A pressing device comprising:
a unit supported to be rotatable;
an arm to press the unit;
a support shaft supporting the arm such that the arm is rotatable; and
a drive transmission to transmit a drive force of a drive source to the unit, the drive transmission mechanism disposed on the arm and including a pressing-member-side drive transmission to transmit the drive force to a drive transmitter of the unit,
wherein the support shaft is disposed coaxially on a fulcrum of rotation of the unit, and
wherein a line passing through an axis center of the support shaft and a contact portion between the unit and the arm forms an angle with a pressure direction of the arm to the unit such that the angle is 80° or more and 100° or less as viewed in an axis direction of the support shaft.

12. The pressing device according to claim 11,
wherein the arm includes a pressing portion to press a pressed portion of the unit, and
wherein any one of the pressing portion and the pressed portion has a linear shape overlapping the line passing through the axis center of the support shaft and the contact portion between the pressed portion and the pressing portion when viewed in the axis direction.

13. The pressing device according to claim 11,
wherein the unit includes a nip forming to form a nip with an opposing structure facing the unit in the pressure direction of the arm, and
wherein the arm presses the nip-forming structure.

14. The pressing device according to claim 11,
wherein the unit includes a connecting shaft connected to the support shaft and rotates around the connecting shaft as a fulcrum.

15. The pressing device according to claim 11, further comprising:
a pressing force adjustor to adjust a pressing force of the arm to the unit.

16. The pressing device according to claim 15,
wherein the pressing force adjustor includes a cam that contacts the arm and a pressing drive source to drive the cam to rotate.

17. The pressing device according to claim 11,
wherein the drive transmission is a gear transmitter having a plurality of deceleration stages.

18. The pressing device according to claim 11,
wherein the drive transmission includes a drive transmission member to receive the drive force from the drive source and transmit the drive force to another drive transmission member disposed on the arm, and
wherein the drive transmission member is disposed coaxially on the support shaft.

19. The pressing device according to claim 11,
wherein the unit is a secondary transfer unit.

20. An image forming apparatus comprising the pressing device according to claim 11.

* * * * *